United States Patent
Chen et al.

(10) Patent No.: US 7,441,733 B2
(45) Date of Patent: Oct. 28, 2008

(54) SUPPORT DEVICE FOR A CHILD VEHICLE SAFETY SEAT

(75) Inventors: Shun-Min Chen, Taipei (TW); Zhi-Ren Zhong, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 0 days.

(21) Appl. No.: 11/806,760

(22) Filed: Jun. 4, 2007

(65) Prior Publication Data

US 2008/0030052 A1 Feb. 7, 2008

(30) Foreign Application Priority Data

Aug. 2, 2006 (CN) ............. 2006 2 0124132 U (51) Int. Cl.
*A47F 5/00* (2006.01)
(52) U.S. Cl. ............ 248/125.8; 248/357; 297/256.16
(58) Field of Classification Search ............ 248/125.8, 248/125.1, 125.3, 125.2, 200.1, 354.1, 354.6, 248/357; 297/256.16; 224/275
See application file for complete search history.

(56) References Cited

U.S. PATENT DOCUMENTS

| 5,370,500 A | * | 12/1994 | Thompson | 416/100 |
| 6,719,248 B2 | * | 4/2004 | Lamont | 248/121 |
| 2003/0042373 A1 | * | 3/2003 | MacLeod | 248/125.1 |
| 2007/0262210 A1 | * | 11/2007 | Oh et al. | 248/125.1 |

FOREIGN PATENT DOCUMENTS

JP 2003-094994 4/2003

* cited by examiner

*Primary Examiner*—Ramon O Ramirez
(74) *Attorney, Agent, or Firm*—Pillsbury Winthrop Shaw Pittman LLP (57) ABSTRACT

A support device includes a positioning tube to be connected to a child vehicle safety seat and formed with a plurality of positioning hole units. A support tube is sleeved telescopically on the positioning tube and is formed with a pair of through holes. A support base is sleeved on the support tube, and has a mounting seat disposed at a horizontal level corresponding to the through holes. A seat height adjusting unit includes an actuator that is mounted movably in the mounting seat, that is biased by a spring member, and that engages removably the through holes and a registered one of the positioning hole units to retain the positioning tube at a desired extended length relative to the support tube.

14 Claims, 8 Drawing Sheets

SUPPORT DEVICE FOR A CHILD VEHICLE SAFETY SEAT

CROSS-REFERENCE TO RELATED APPLICATION

This application claims priority of Chinese application no. 200620124132.6, filed on Aug. 2, 2006.

BACKGROUND OF THE INVENTION

1. Field of the Invention

The invention relates to a support device, more particularly to a support device for a child vehicle safety seat.

2. Description of the Related Art

A child vehicle safety seat usually includes a support device connected to a front bottom part of a seat member for standing on a vehicle floor. The support device has a telescopic configuration so that the seat member can be placed stably on a vehicle seat at a desired inclination. One example of the conventional support device is disclosed in Japanese patent publication number JP2003094994.

The conventional support device disclosed in the aforementioned Japanese patent publication is disadvantageous in that, since only one lateral side of a support member of the support device is formed with a plurality of spaced apart axially aligned positioning holes for engagement with a height adjusting mechanism, sturdiness of the support device is not satisfactory.

SUMMARY OF THE INVENTION

Therefore, the object of the present invention is to provide a sturdy and easy-to-operate support device for a child vehicle safety seat.

According to this invention, a support device is adapted for a child vehicle safety seat, and includes a positioning tube, a support tube, a support base, and a seat height adjusting unit.

The positioning tube has a first tube portion adapted to be connected to the child vehicle safety seat, and a second tube portion opposite to the first tube portion. The positioning tube is formed with a plurality of positioning hole units spaced apart from each other along a tube axis. Each of the positioning hole units includes a pair of positioning holes that are disposed at diametrically opposite positions relative to the tube axis.

The support tube is sleeved telescopically on the second tube portion of the positioning tube, and is formed with a pair of through holes that are disposed at diametrically opposite positions relative to the tube axis.

The support base is sleeved on the support tube, and has a mounting seat disposed at a horizontal level corresponding to the through holes in the support tube.

The seat height adjusting unit includes an actuator and a spring member. The actuator is mounted movably in the mounting seat, and has a pair of extending arms respectively disposed at opposite lateral sides of the support tube, and a pair of protruding members each disposed at a respective one of the extending arms. The protruding members are extendible into the through holes and the positioning holes of a registered one of the positioning hole units to retain the positioning tube at a desired extended length relative to the support tube. The spring member is disposed in the mounting seat and applies a biasing force to the actuator.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
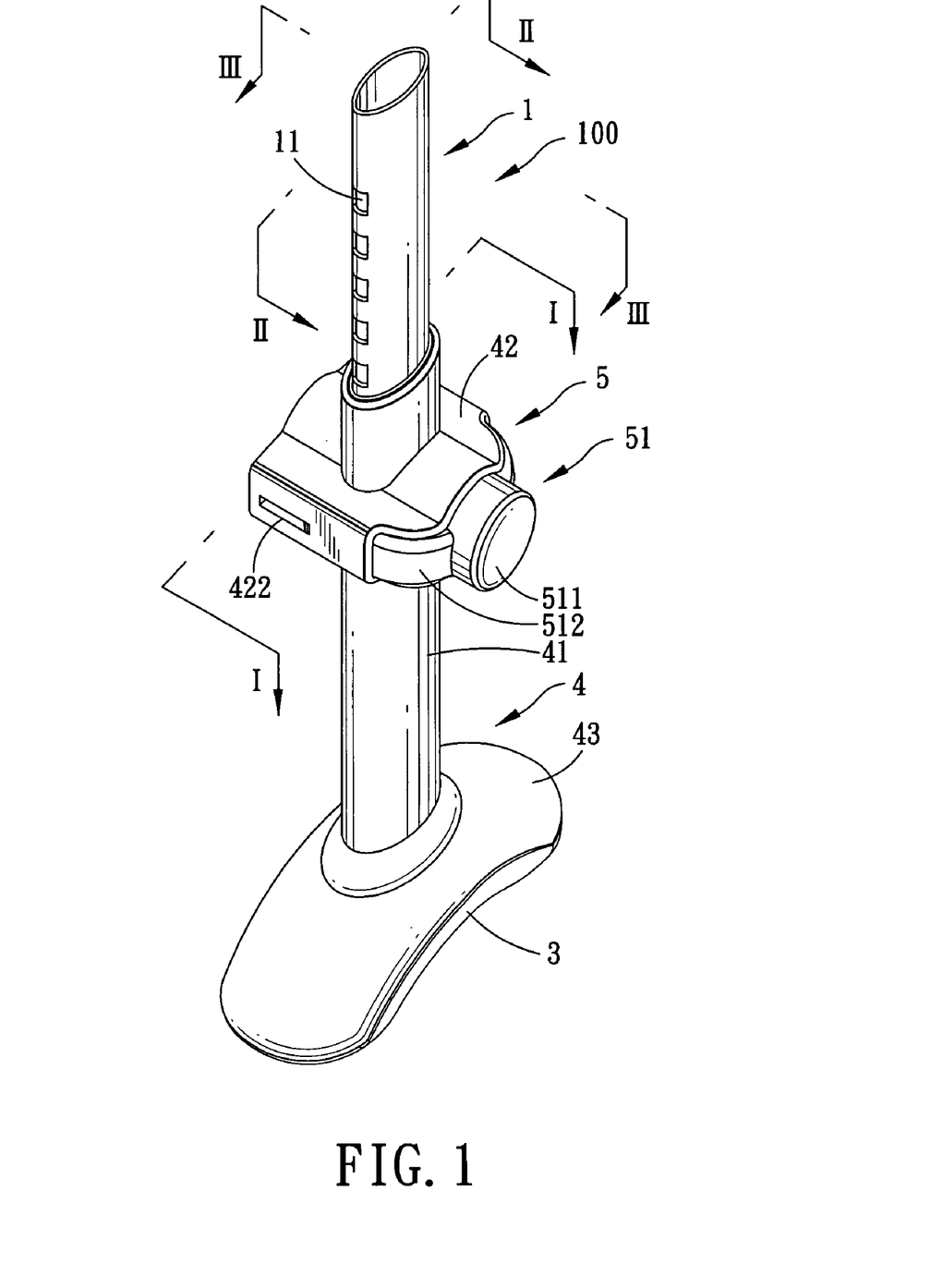
FIG. 1 is an assembled perspective view of the preferred embodiment of a support device according to the present invention.
Figure 2:
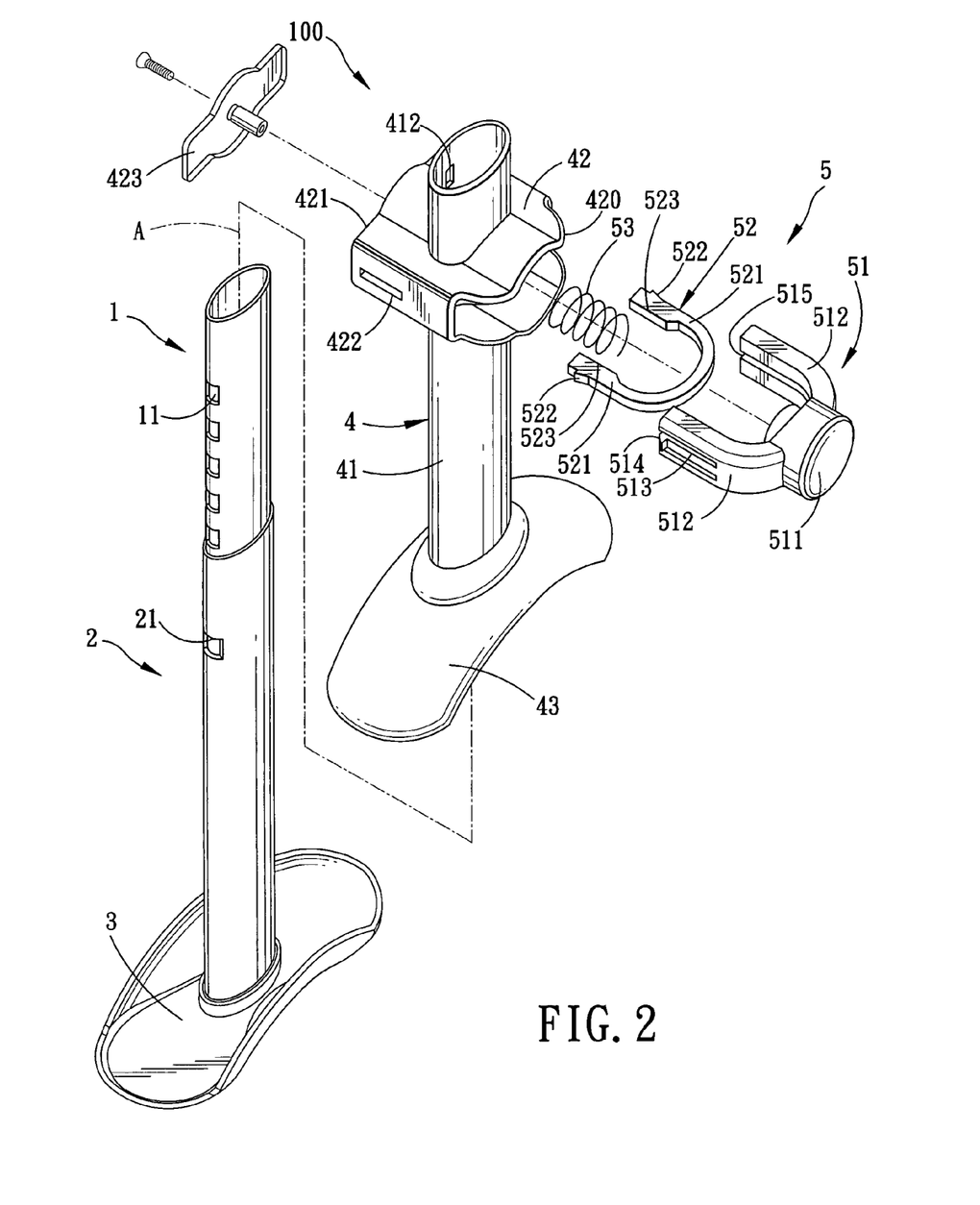
FIG. 2 is an exploded perspective view of the preferred embodiment.

FIGS. 1 and 2 illustrate the preferred embodiment of a support device 100 according to the present invention, which is adapted for connection to a front bottom part of a seat member of a child vehicle safety seat (not shown). The support device 100 comprises a positioning tube 1 made of metal, a support tube 2 made of metal and sleeved telescopically on the positioning tube 1, an elongate floor base 3 fixed to a bottom end of the support tube 2 and to be disposed on a vehicle floor (not shown), a support base 4 made of plastic and sleeved on the support tube 2, and a seat height adjusting unit 5 mounted in the support base 4 for retaining the positioning tube 1 at a desired extended length relative to the support tube 2.

The positioning tube 1 has a first tube portion to be connected to the seat member of the child vehicle safety seat, and a second tube portion opposite to the first tube portion. The positioning tube 1 has a tube wall formed with a plurality of positioning hole units which are spaced apart from each other along the direction of a tube axis (A). Each of the positioning hole units includes a pair of positioning holes 11 (see FIG. 5) that are disposed at diametrically opposite positions relative to the tube axis (A). Since the feature of this invention does not reside in the connection between the positioning tube 1 and the seat member of the child vehicle safety seat, a description of the same is omitted herein for the sake of brevity.

The support tube 2 is sleeved telescopically on the second tube portion of the positioning tube 1, and is formed with a pair of through holes 21 (see FIG. 5) that are disposed at diametrically opposite positions relative to the tube axis (A).

The support base 4 includes a tubular sleeve 41 sleeved on the support tube 2, a base cap 43 formed integrally with a bottom end of the tubular sleeve 41 for covering the floor base 3, and a mounting seat 42 formed integrally on an upper part of the tubular sleeve 41. The mounting seat 42 extends transverse to the tube axis (A), and is disposed at a horizontal level corresponding to the through holes 21 in the support tube 2. The mounting seat 42 has front and rear open end portions 420, 421. The front end portion 420 extends radially relative to the tube axis (A). A rear cap 423 is provided to close the rear end portion 421 of the mounting seat 42.

Figure 3:
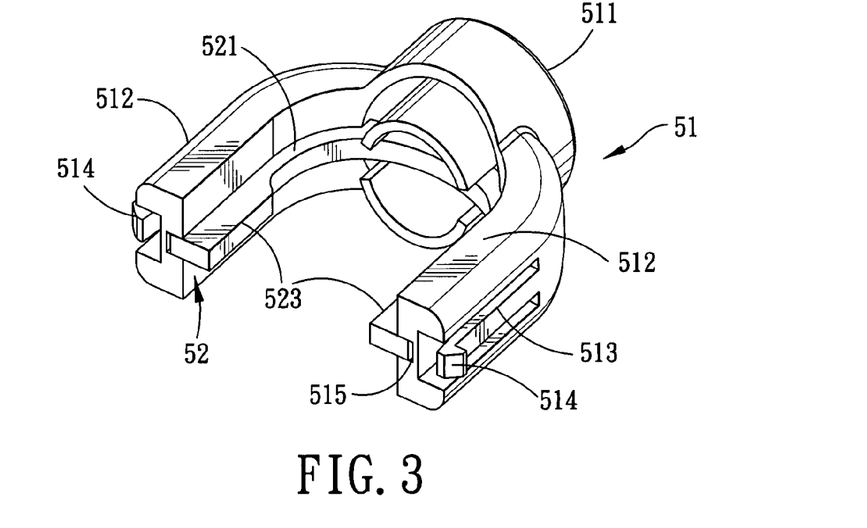
FIG. 3 is an assembled perspective view of an actuator of the preferred embodiment.
Figure 4:
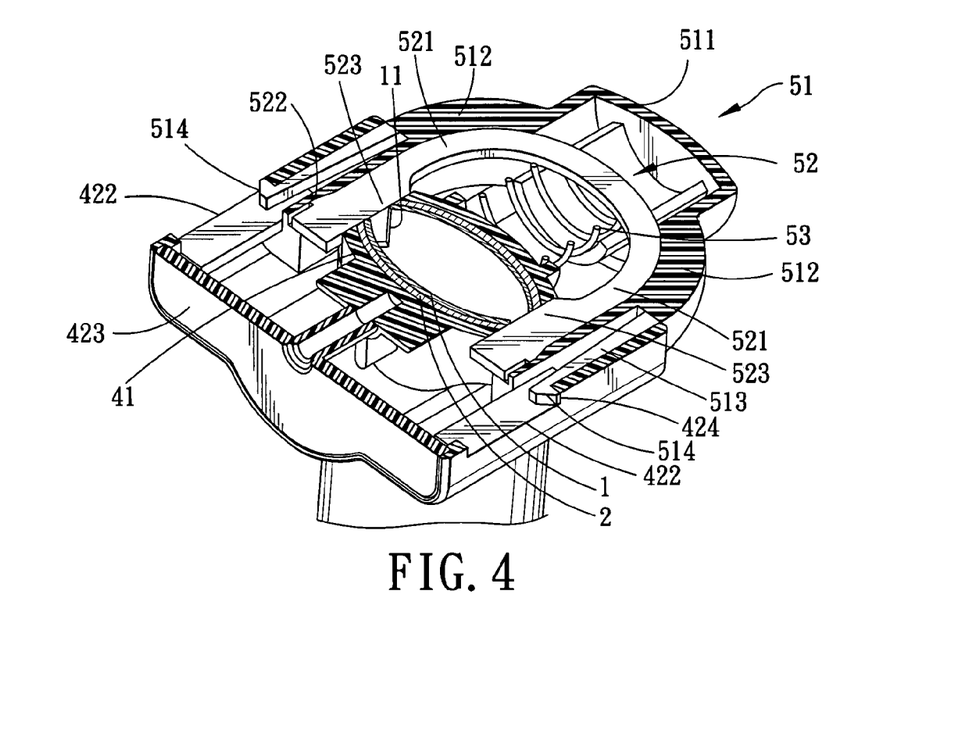
FIG. 4 is a sectional view of the preferred embodiment, taken along line I-I in FIG. 1, illustrating how a positioning tube is locked relative to a support tube.

Referring to FIGS. 2, 3 and 4, the seat height adjusting unit 5 is received in the mounting seat 42 through the front end portion 420, and includes an actuator 51 and a spring member 53. The actuator 51 is mounted movably in the mounting seat 42, and has a pair of extending arms 512 that are respectively disposed at opposite lateral sides of the support tube 2, and a cylindrical press part 511 that interconnects the extending arms 512 and that is accessible from the front end portion 420 of the mounting seat 42. Each of the extending arms 512 is formed with a resilient part 513, which is a cantilever structure. Each resilient part 513 is connected to the respective extending arm 512, and has a distal end formed with a stop portion 514 that is disposed at an outer side of the respective extending arm 512. In this embodiment, the mounting seat 42 is formed with a guide slot unit that includes a pair of lateral guide slots 422, each of which is disposed adjacent to a respective one of the extending arms 512 of the actuator 51. The stop portions 514 extend movably and respectively into the guide slots 422 to limit range of movement of the actuator 51 relative to the mounting seat 42.

The inner sides of the extending arms 512 cooperate with a rear side of the press part 511 to form retaining groove 515. The actuator 51 further includes a U-shaped engaging member 52 made of metal and retained in the retaining groove 515. The engaging member 52 includes a pair of resilient end arms 521 mounted respectively on the inner sides of the extending arms 512, a pair of barb parts 522 each formed on an outer side of a distal end of a respective one of the end arms 521, and a pair of protruding members 523 each formed on an inner side of the distal end of a respective one of the end arms 521. Each barb part 522 abuts against the inner side of the respective extending arm 512 to retain firmly the engaging member 52 in the retaining groove 515. The tubular sleeve 41 is further formed with a pair of openings 411 (see FIG. 5) registered with the through holes 21 in the support tube 2. The protruding members 523 are extendible into the openings 411, the through holes 21 and the positioning holes 11 of a registered one of the positioning hole units in the positioning tube 1 to retain the positioning tube 1 at the desired extended length relative to the support tube 2.

The actuator 51 is movable in the mounting seat 42 radially relative to the tube axis (A) between a locking position (see FIGS. 4 to 7), where the positioning tube 1 is retained at the desired extended length relative to the support tube 2, and an unlocking position (see FIGS. 8 to 10), where the protruding members 523 cease to extend into the through holes 21 and the positioning holes 11 of the positioning hole units to permit adjustment of the extended length of the positioning tube 1 relative to the support tube 2. When the actuator 51 is at the locking position, the stop portions 514 abut against front slot-defining walls 424 of the guide slots 422, as best shown in FIG. 4. On the other hand, when the actuator 51 is at the unlocking position, the stop portions 514 are spaced apart from the front slot-defining walls 424 of the guide slots 422, as best shown in FIG. 8.

The spring member 53 is disposed in the mounting seat 42, and has opposite ends abutting against the tubular sleeve 41 and the engaging member 52, respectively. The spring member 53 applies a biasing force to the actuator 51, and biases the actuator 51 to the locking position away from the positioning and support tubes 1, 2.

Figure 5:
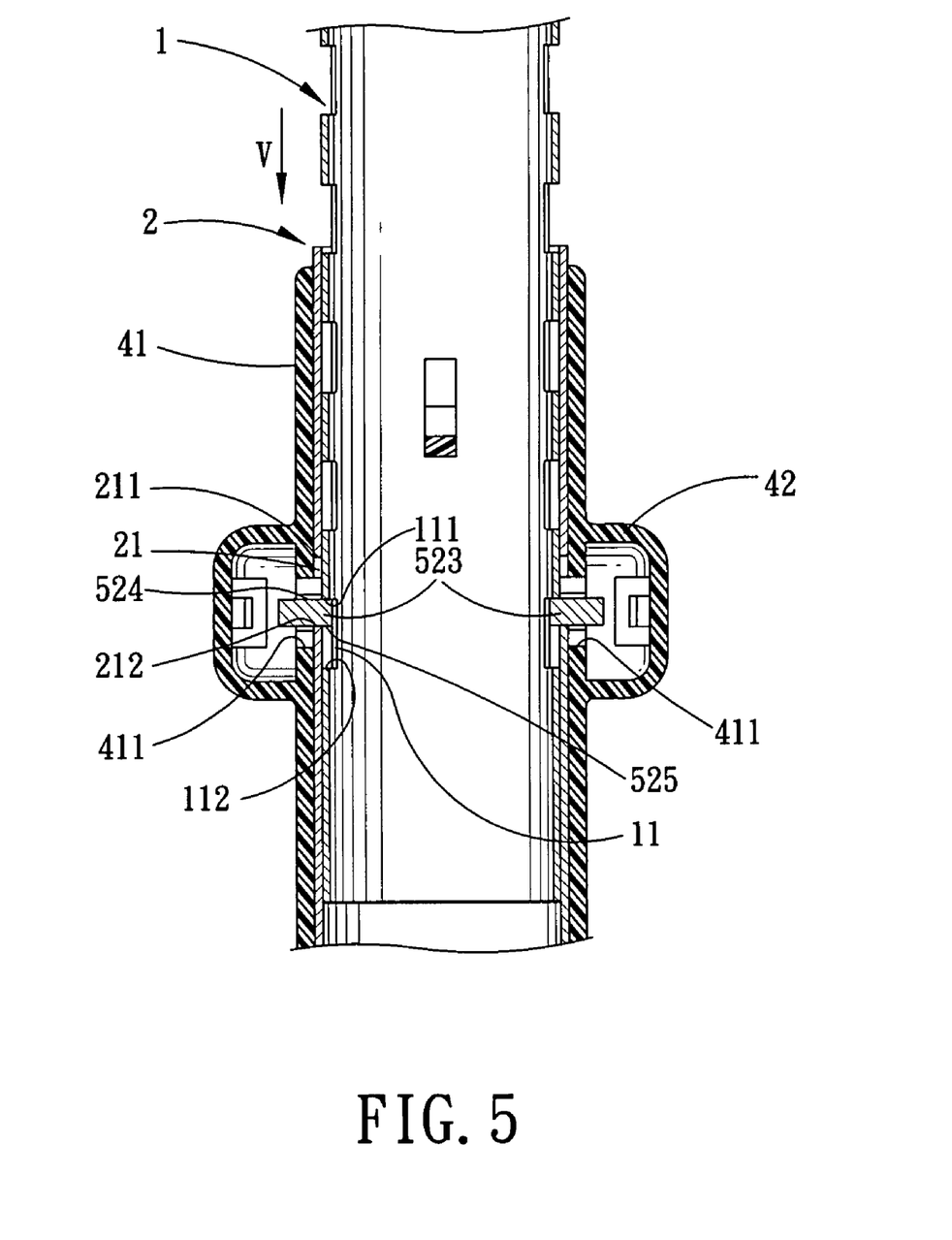
FIG. 5 is a sectional view of the preferred embodiment, taken along line II-II in FIG. 1, illustrating the positioning tube when locked relative to the support tube.
Figure 6:
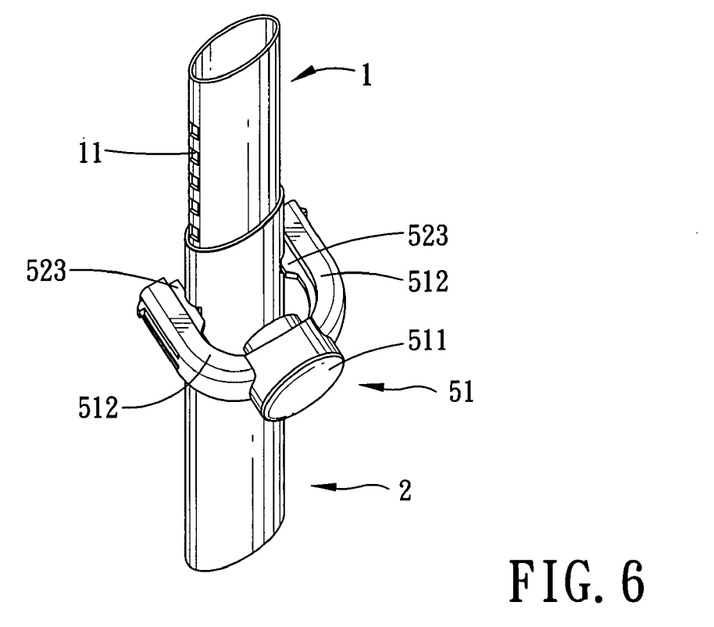
FIG. 6 is a fragmentary assembled perspective view of the preferred embodiment, illustrating the positioning tube when locked relative to the support tube.
Figure 7:
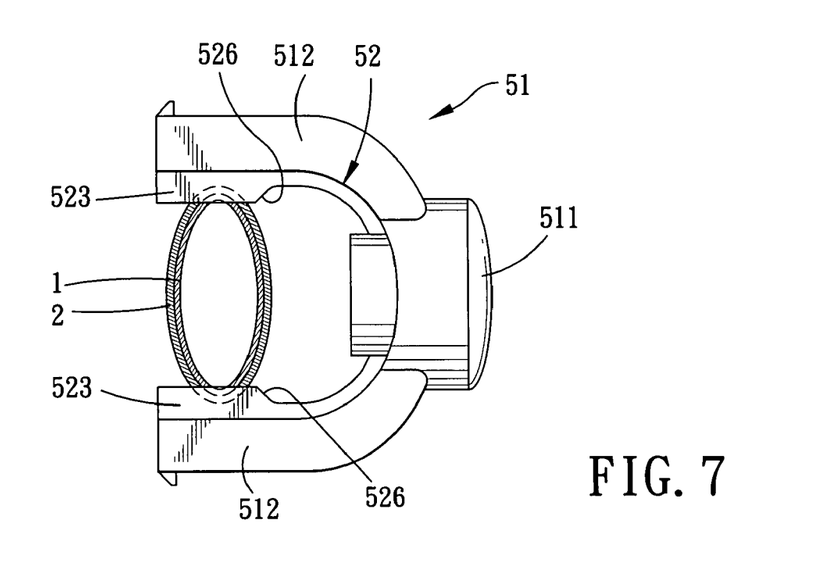
FIG. 7 is a partly sectional schematic top view of the preferred embodiment, illustrating the positioning tube when locked relative to the support tube.

As best shown in FIG. 5, in this embodiment, each of the positioning holes 11 in the positioning tube 1 has a hole-defining wall with flat top and bottom edges 111, 112. Each of the through holes 21 in the support tube 2 has a hole-defining wall with flat top and bottom edges 211, 212. Each of the protruding members 523 of the engaging member 52 has flat top and bottom contact sides 524, 525. When the positioning tube 1 is subjected to a load (V) while locked relative to the support tube 2, i.e., the actuator 51 is at the locking position, the top contact sides 524 of the protruding members 523 abut against the top edges 111 of the positioning holes 11, and the bottom contact sides 525 of the protruding members 523 abut against the bottom edges 212 of the through holes 21. As a result, the load (V) on the positioning tube 1 is shared by the protruding members 523 and is distributed evenly to the lateral sides of the support tube 2.

Figure 8:
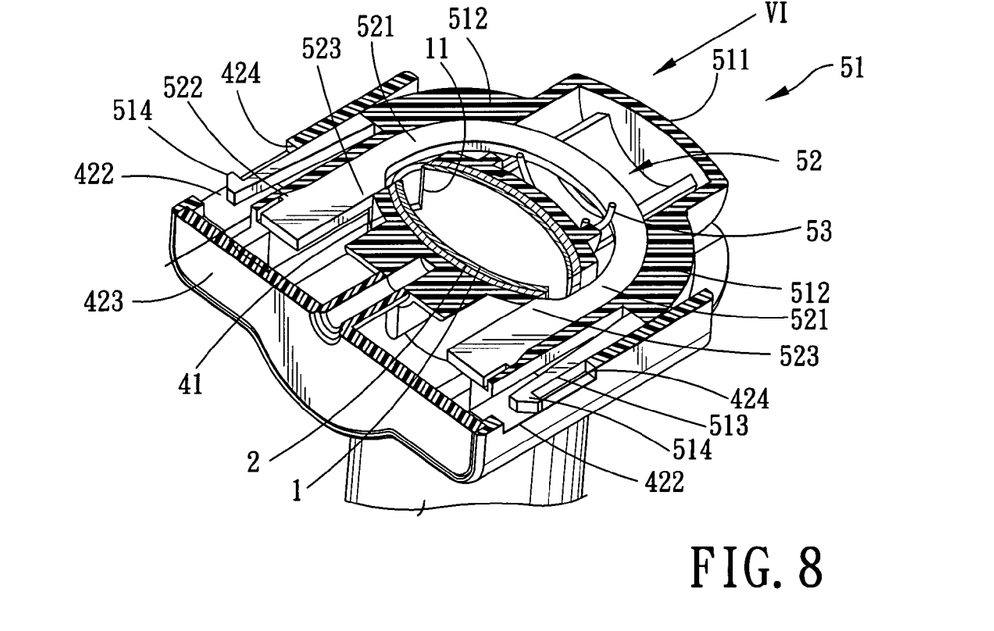
FIG. 8 is a view similar to FIG. 4, but illustrating the positioning tube when unlocked relative to the support tube.
Figure 9:
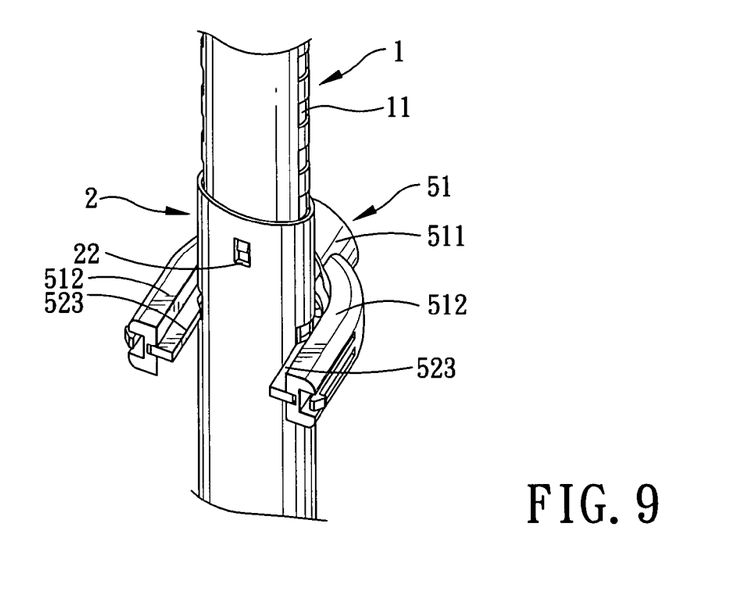
FIG. 9 is a fragmentary assembled perspective view of the preferred embodiment, illustrating the positioning tube when unlocked relative to the support tube.
Figure 10:
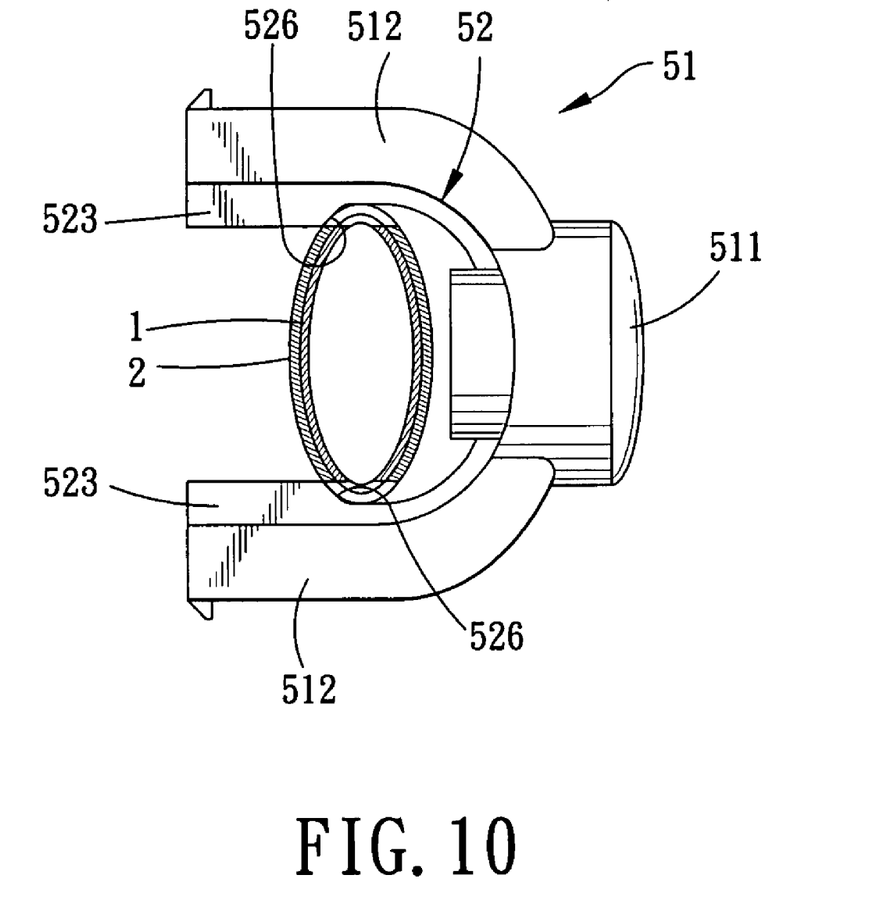
FIG. 10 is a view similar to FIG. 7, but illustrating the positioning tube when unlocked relative to the support tube.

Referring to FIGS. 8, 9 and 10, to adjust the extended length of the positioning tube 1 relative to the support tube 2, the press part 511 of the actuator 51 is pushed in a direction (VI) shown in FIG. 8 to move the actuator 51 in a radial inward direction relative to the tube axis (A) to the unlocking position, where the protruding members 523 cease to extend into the through holes 21 and the positioning holes 11 of the positioning hole units. At this time, curved edges 526 located at one end of the protruding members 523 opposite to the distal ends of the end arms 521 are moved to a rear side of the support tube 2. The extended length of the positioning tube 1 relative to the support tube 2 can be adjusted at this time so as to achieve a desired inclination for the seat member of the child vehicle safety seat.

After adjustment of the positioning tube 1 to the desired extended length relative to the support tube 2, the press part 511 of the actuator 51 is released, and the spring member 53 biases the actuator 51 in the radial outward direction relative to the tube axis (A) to restore the actuator 51 to the locking position, thereby retaining the positioning tube 1 at the desired extended length relative to the support tube 2.

Figure 11:
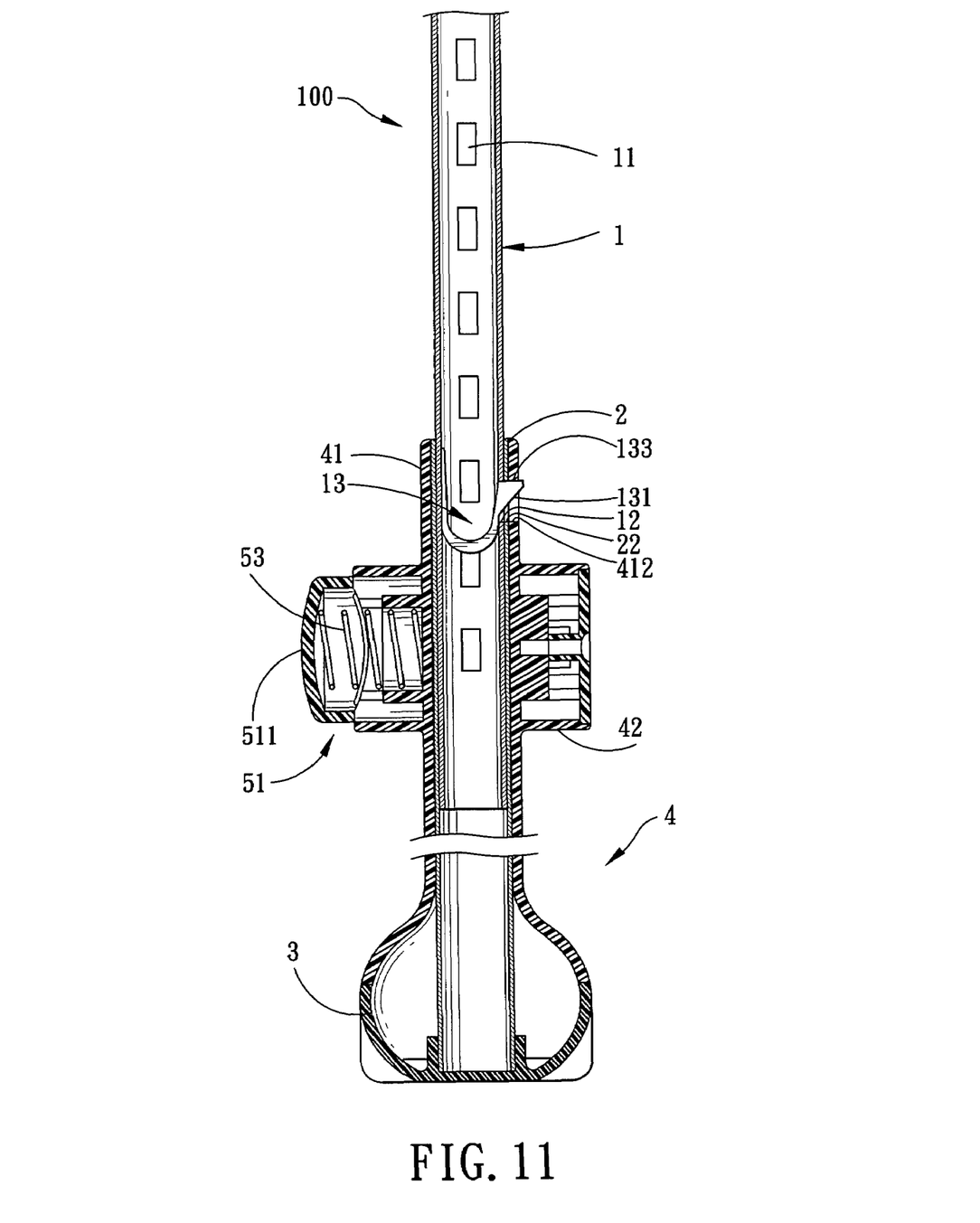
FIG. 11 is a fragmentary schematic sectional view of the preferred embodiment, taken along line III-III in FIG. 1, illustrating a resilient limiting component that prevents removal of the positioning tube from the support tube.

As previously described, the positioning tube 1 has a first tube portion to be connected to the seat member of the child vehicle safety seat, and a second tube portion opposite to the first tube portion. As shown in FIGS. 2, 9 and 11, the second tube portion of the positioning tube 1 is formed with a first limit hole 12 proximate to a bottom end of the positioning tube 1, the support tube 2 is formed with a second limit hole 22 proximate to an upper end of the support tube 2, and the tubular sleeve 41 is formed with a third limit hole 412 proximate to an upper end of the tubular sleeve 41. The first, second and third limit holes 12, 22, 412 are disposed at a rear side of the support device 100 and are similar in dimensions. The positioning tube 1 is further provided with a resilient limit component 13 therein to prevent removal of the positioning tube 1 from the support tube 2. In this embodiment, the resilient limit component 13 is made of plastic, is formed in a U shape, and has a first end portion abutting against an inner tube surface of the positioning tube 1, and a second end portion formed with a hook 131. When the limit holes 12, 22, 412 are aligned during adjustment of the extended length of the positioning tube 1 relative to the support tube 2, the hook 131 extends into the limit holes 12, 22, 412, and a flat top contact side 133 of the hook 131 abuts against flat top hole edges of the limit holes 12, 22, 412, there by preventing further movement of the positioning tube 1 relative to the support tube 2 in a direction away from the floor base 3.

In sum, the protruding members 523 of the actuator 51 engage opposite lateral sides of the positioning and support tubes 1, 2 when the actuator 51 is at the locking position so that load forces on the positioning tube 1 can be distributed evenly to the lateral sides of the support tube 2, thus resulting in a sturdy construction for the support device 100 of this invention. In addition, since movement of the actuator 51 results in corresponding movement of the protruding members 523, and due to the spring member 53 that biases the actuator 51 to the locking position, locking and unlocking of the positioning tube 1 relative to the support tube 2 can be accomplished with relative ease.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A support device for a child vehicle safety seat, said support device comprising:
    a positioning tube having a first tube portion adapted to be connected to the child vehicle safety seat, and a second tube portion opposite to said first tube portion, said positioning tube being formed with a plurality of positioning hole units spaced apart from each other along a tube axis, each of said positioning hole units including a pair of positioning holes that are disposed at diametrically opposite positions relative to the tube axis;
    a support tube sleeved telescopically on said second tube portion of said positioning tube and formed with a pair of through holes that are disposed at diametrically opposite positions relative to the tube axis;
    a support base sleeved on said support tube, and having a mounting seat disposed at a horizontal level corresponding to said through holes in said support tube; and
    a seat height adjusting unit including
        an actuator mounted movably in said mounting seat and having a pair of extending arms respectively disposed at opposite lateral sides of said support tube, and a pair of protruding members each disposed at a respective one of said extending arms, said protruding members being extendible into said through holes and said positioning holes of a registered one of said positioning hole units to retain said positioning tube at a desired extended length relative to said support tube, and
        a spring member disposed in said mounting seat for applying a biasing force to said actuator.

2. The support device as claimed in claim 1, wherein said actuator is movable in said mounting seat between a locking position, where said positioning tube is retained at the desired extended length relative to said support tube, and an unlocking position, where said protruding members cease to extend into said through holes and said positioning holes of said positioning hole units to permit adjustment of the extended length of said positioning tube relative to said support tube.

3. The support device as claimed in claim 2, wherein said actuator is movable in a radial direction relative to the tube axis, and said spring member biases said actuator to the locking position away from said positioning and support tubes.

4. The support device as claimed in claim 1, wherein said mounting seat is formed with a guide slot unit that includes a pair of lateral guide slots, each disposed adjacent to a respective one of said extending arms of said actuator, said actuator further having a pair of stop portions each disposed at an outer side of a respective one of said extending arms, said stop portions extending movably and respectively into said guide slots to limit range of movement of said actuator relative to said mounting seat.

5. The support device as claimed in claim 1, wherein said mounting seat has an open end portion that extends radially relative to the tube axis, said actuator including a press part that interconnects said extending arms and that is accessible from said open end portion of said mounting seat.

6. The support device as claimed in claim 1, wherein each of said positioning holes has a hole-defining wall with a flat top edge, and each of said through holes has a hole-defining wall with a flat bottom edge, and
    wherein said protruding members abut against said top edges of said positioning holes of the registered one of said positioning holes units and further against said bottom edges of said through holes to retain said positioning tube at the desired extended length relative to said support tube.

7. The support device as claimed in claim 1, wherein said actuator includes a U-shaped engaging member, said engaging member having a pair of end arms mounted respectively on said inner sides of said extending arms, each of said protruding members being formed on a distal end of a respective one of said end arms.

8. The support device as claimed in claim 7, wherein each of said end arms of said engaging member has a barb part that abuts against the respective one of said extending arms to retain said engaging member on said extending arms.

9. The support device as claimed in claim 1, wherein said positioning tube is provided with a resilient limit component therein to prevent removal of said positioning tube from said support tube.

10. The support device as claimed in claim 9, wherein said second tube portion of said positioning tube is formed with a first limit hole, said support tube being formed with a second limit hole proximate to an upper end of said support tube, said resilient limit component being formed in a U shape and having an end portion formed with a hook, said hook being extendible removably into said first and second limit holes to prevent removal of said positioning tube from said support tube.

11. The support device as claimed in claim 10, wherein said support base further has a tubular sleeve sleeved on said support tube, said mounting seat being formed on said tubular sleeve, said tubular sleeve being formed with a third limit hole proximate to an upper end of said tubular sleeve, said hook being extendible removably into said first, second and third limit holes.

12. A support device comprising:
    a positioning tube formed with a plurality of positioning hole units spaced apart from each other along a tube axis, each of said positioning hole units including a pair of positioning holes that are disposed at diametrically opposite positions relative to the tube axis;
    a support member sleeved telescopically on said positioning tube and formed with a pair of through holes that are disposed at diametrically opposite positions relative to the tube axis, said support member having a mounting seat disposed at a horizontal level corresponding to said through holes; and
    an actuator mounted movably in said mounting seat and having two protruding portions that correspond respectively in position to said through holes, said actuator being biased for movement between a locking position, where said protruding portions engage said through holes and said positioning holes of a registered one of said positioning hole units to retain said positioning tube at a desired extended length relative to said support member, and an unlocking position, where said protruding portions are disengaged from said through holes and said positioning holes of said positioning hole units to permit adjustment of the extended length of said positioning tube relative to said support member.

13. The support device as claimed in claim 12, wherein said actuator is movable in a radial direction relative to the tube axis.

14. The support device as claimed in claim 12, wherein said actuator is U-shaped and has a pair of end arms, each of said protruding portions being disposed at a respective one of said end arms.

* * * * *